(12) United States Patent
Matsunaga et al.

(10) Patent No.: US 9,472,356 B2
(45) Date of Patent: Oct. 18, 2016

(54) TANK-TYPE VACUUM CIRCUIT BREAKER

(75) Inventors: Toshihiro Matsunaga, Tokyo (JP); Masahiro Arioka, Tokyo (JP); Hideki Miyatake, Tokyo (JP); Tadahiro Yoshida, Tokyo (JP); Toru Kimura, Tokyo (JP); Naoki Tanaka, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/113,586

(22) PCT Filed: Sep. 14, 2011

(86) PCT No.: PCT/JP2011/070962
§ 371 (c)(1),
(2), (4) Date: Oct. 24, 2013

(87) PCT Pub. No.: WO2012/164764
PCT Pub. Date: Dec. 6, 2012

(65) Prior Publication Data
US 2014/0042125 A1 Feb. 13, 2014

(30) Foreign Application Priority Data
Jun. 2, 2011 (JP) ................................. 2011-124172

(51) Int. Cl.
*H01H 9/08* (2006.01)
*H02B 13/035* (2006.01)
(Continued)

(52) U.S. Cl.
CPC ............ *H01H 9/08* (2013.01); *H02B 13/0354* (2013.01); *H01H 2033/6665* (2013.01); *H02B 13/0358* (2013.01); *H02B 13/045* (2013.01)

(58) Field of Classification Search
CPC .... H01H 33/00; H01H 33/66; H01H 33/662; H01H 33/666; H01H 2003/6665; H01H 9/08; H01H 33/66207; H02B 13/02; H02B 13/0354; H02G 3/22
USPC ............ 218/10, 97, 118, 139, 140, 124, 134
See application file for complete search history.

(56) References Cited

U.S. PATENT DOCUMENTS 3,855,435 A * 12/1974 Himi .............................. 218/138
2004/0104201 A1 * 6/2004 Sato .................... H02B 13/0354
218/118

(Continued)

FOREIGN PATENT DOCUMENTS

CN 101809700 A 8/2010
JP 60-249219 A 12/1985
(Continued)

OTHER PUBLICATIONS

International Search Report (PCT/ISA/210) mailed on Oct. 18, 2011, by the Japanese Patent Office as the International Searching Authority for International Application No. PCT/JP2011/070962.
(Continued)

*Primary Examiner* — Renee Luebke
*Assistant Examiner* — William Bolton
(74) *Attorney, Agent, or Firm* — Buchanan Ingersoll & Rooney PC

(57) ABSTRACT

A tank-type vacuum circuit breaker includes: a pressure tank; an insulating frame that is detachably supported by a support member provided in the pressure tank using a coupling; a vacuum interrupter that is supported by the insulating frame and includes a stationary electrode and a moving electrode; a stationary-electrode side terminal that is connectably/disconnectably connected to a bushing-terminal side internal conductor; a moving-electrode side terminal that is connectably/disconnectably connected to a bushing-terminal side internal conductor; and an insulating rod, the inside end of which is detachably coupled to the moving electrode and the outside end of which is coupled to an opening/closing actuation mechanism that opens/closes the contacts of the stationary contact and moving contact. The vacuum interrupter, the stationary-electrode side terminal, the moving-electrode side terminal and the insulating frame are integrated into a unit, and the unit can be removed and mounted by disconnecting the connections and the couplings.

10 Claims, 6 Drawing Sheets

(51) Int. Cl.
  *H02B 13/045*  (2006.01)
  *H01H 33/666*  (2006.01)

(56) References Cited

U.S. PATENT DOCUMENTS

| | | | |
|---|---|---|---|
| 2005/0236371 A1* | 10/2005 | Cameroni et al. | 218/118 |
| 2010/0181291 A1* | 7/2010 | Gentsch | 218/139 |
| 2010/0288733 A1* | 11/2010 | Ichikawa et al. | 218/134 |
| 2012/0160810 A1* | 6/2012 | Ohtsuka et al. | 218/140 |

FOREIGN PATENT DOCUMENTS

| | | |
|---|---|---|
| JP | 2007-306701 A | 11/2007 |
| JP | 2009-261111 A | 11/2009 |
| JP | 2010-178526 A | 8/2010 |
| WO | WO 2011/052010 A1 | 5/2011 |
| WO | WO 2011/104915 A1 | 9/2011 |

OTHER PUBLICATIONS

Chinese First Office Action dated Mar. 11, 2015 issued in the corresponding Chinese Patent Application No. 201180071232.0 and English language translation (14 pages).

Chinese Second Office Action dated Oct. 30, 2015 issued in the corresponding Chinese Patent Application No. 201180071232.0 and English language translation (12 pages).

* cited by examiner

TANK-TYPE VACUUM CIRCUIT BREAKER

TECHNICAL FIELD

The present invention relates to a tank-type vacuum circuit breaker for protecting a power transmission and reception/distribution facility.

BACKGROUND ART

A conventional tank-type vacuum circuit breaker has a structure shown in FIG. 5. In a pressure tank 1 that is electrically grounded and filled with an insulating gas, a vacuum interrupter 7 is electrically insulated from the wall surface of the pressure tank 1 and supported horizontally. A moving electrode 10 of the vacuum interrupter 7 is connected to an insulating rod 12 that electrically insulates the electrode 10 from an actuation mechanism 11 of the breaker, then passes through a flange 4 that closes an opening 3 of the pressure tank 1 through a flexible bellows 13 that enables an opening and closing actuation of the breaker from the outside of the pressure tank 1 by the actuation mechanism 11 with the pressure tank 1 kept airtight, and then is coupled to the actuation mechanism 11.

On the other hand, at one end of the pressure tank 1 to which a stationary electrode 9 of the vacuum interrupter 7 faces, another opening 32 for working is provided to allow the vacuum interrupter 7 to be inserted into or taken out from the pressure tank 1 in replacing the vacuum interrupter 7. The components from the working opening 32 to the actuation mechanism 11 are directly aligned in the horizontal direction. Note that the working opening 32 is normally sealed with a lid plate 33.

Furthermore, one pair of openings 17a and 17b facing upward are provided in the pressure tank 1. The vacuum interrupter 7 is electrically connected to bushing terminals 22a and 22b through: terminals 14a and 14b; compartment spacers 18a and 18b passing through the openings 17a and 17b while keeping electrical insulation from the pressure tank 1 and keeping the pressure tank 1 airtight; and conductors 21a and 21b passing through current transformers 23a and 23b and bushings 20a and 20b.

Another tank-type vacuum circuit breaker has an airtight compartment collectively including those components from the vacuum interrupter to the bushing terminals without the compartment spacers (for example, see PTL 2).

CITATION LIST

Patent Literature

PTL 1: JP-A-2010-178526
PTL 2: JP-A-2007-306701

SUMMARY OF INVENTION

Technical Problem

In the tank-type vacuum circuit breaker as described above, the vacuum interrupter 7 has an electrical and mechanical life shorter than that of the other components of the breaker including the actuation mechanism 11. Furthermore, when the breaker interrupts a large current such as a short-circuit current due to a system accident, the life of the vacuum interrupter 7 is additionally shortened.

Due to this, the vacuum interrupter 7 may need to be replaced while the breaker is being operated, and the outage hours for the replacement needs to be as short as possible, so the workability of the replacement of the vacuum interrupter 7 needs to be taken into account. Furthermore, replacing the vacuum interrupter 7 with the breaker still installed in the power transmission and reception/distribution facility needs to reserve a workspace necessary for the replacement around the facility when the breaker is installed.

In replacing the vacuum interrupter 7, disassembling and reassembling of the vacuum interrupter 7, the insulating rod 12 and the terminals 14a and 14b need to be performed within the pressure tank 1. In the structure of the tank-type vacuum circuit breaker as described above, the work on the connection of the stationary electrode 9 of the vacuum interrupter 7 and the terminal 14a can be performed through the working opening 32. However, the work on the connection of the moving electrode 10 of the vacuum interrupter 7 and the insulating rod 12 and terminal 14b requires removing the actuation mechanism 11, the bushing 20b, the compartment spacer 18b and the like to open the openings 3 and 17b or providing another working opening on the wall surface of the pressure tank 1 near the moving electrode 10 of the vacuum interrupter 7, which causes a problem of reduced workability and longer working hours due to two openings necessary for work.

Furthermore, replacing the vacuum interrupter 7 requires a wide workspace for taking out/inserting the vacuum interrupter 7 in the longitudinal direction through the working opening 32.

Solution to Problem

A tank-type vacuum circuit breaker in accordance with the invention includes: a pressure tank that is electrically grounded and filled with an insulating gas; an insulating frame that is mechanically detachably supported by a support member provided in the pressure tank using a coupling; at vacuum interrupter that is supported by the insulating frame and includes a stationary electrode and a moving electrode; a stationary-electrode side terminal that is provided on the stationary-electrode side and is electrically connectably/disconnectably connected to one hushing-terminal side internal conductor using a connection; a moving-electrode side terminal that is provided on the moving-electrode side and is electrically connectably/disconnectably connected to the other bushing-terminal side internal conductor using a connection; and an insulating rod, the inside end of which is mechanically detachably coupled to the moving electrode using a coupling and the outside end of which is coupled to an opening/closing actuation mechanism that is positioned outside the pressure tank and opens/closes the contacts of the stationary contact and moving contact, wherein the vacuum interrupter, the stationary-electrode side terminal, the moving-electrode side terminal and the insulating frame are integrated into a unit, and the unit can be removed and mounted within the pressure tank by disconnecting the connections and the couplings.

Advantageous Effects of Invention

According to the tank-type vacuum circuit breaker of the invention, since the vacuum interrupter, the stationary-electrode side terminal, the moving-electrode side terminal, the insulating frame and the like are integrated into the unit, in repairing or replacing the vacuum interrupter, the whole unit can be taken out from the pressure tank by disconnecting the connections and the couplings within the pressure tank. This can reduce the amount of work within the pressure tank to facilitate the vacuum interrupter replacement and also reduce the number of work places for sealing the opening after the vacuum interrupter replacement, thereby reducing overall working hours. Furthermore, the reduction in the number of work places for sealing the opening leads to improvement in airtight reliability of the pressure tank. Furthermore, the unit can be inserted or taken out in a direction along the radius of the vacuum interrupter, which can reduce the workspace.

DESCRIPTION OF EMBODIMENTS

Figure 1A:
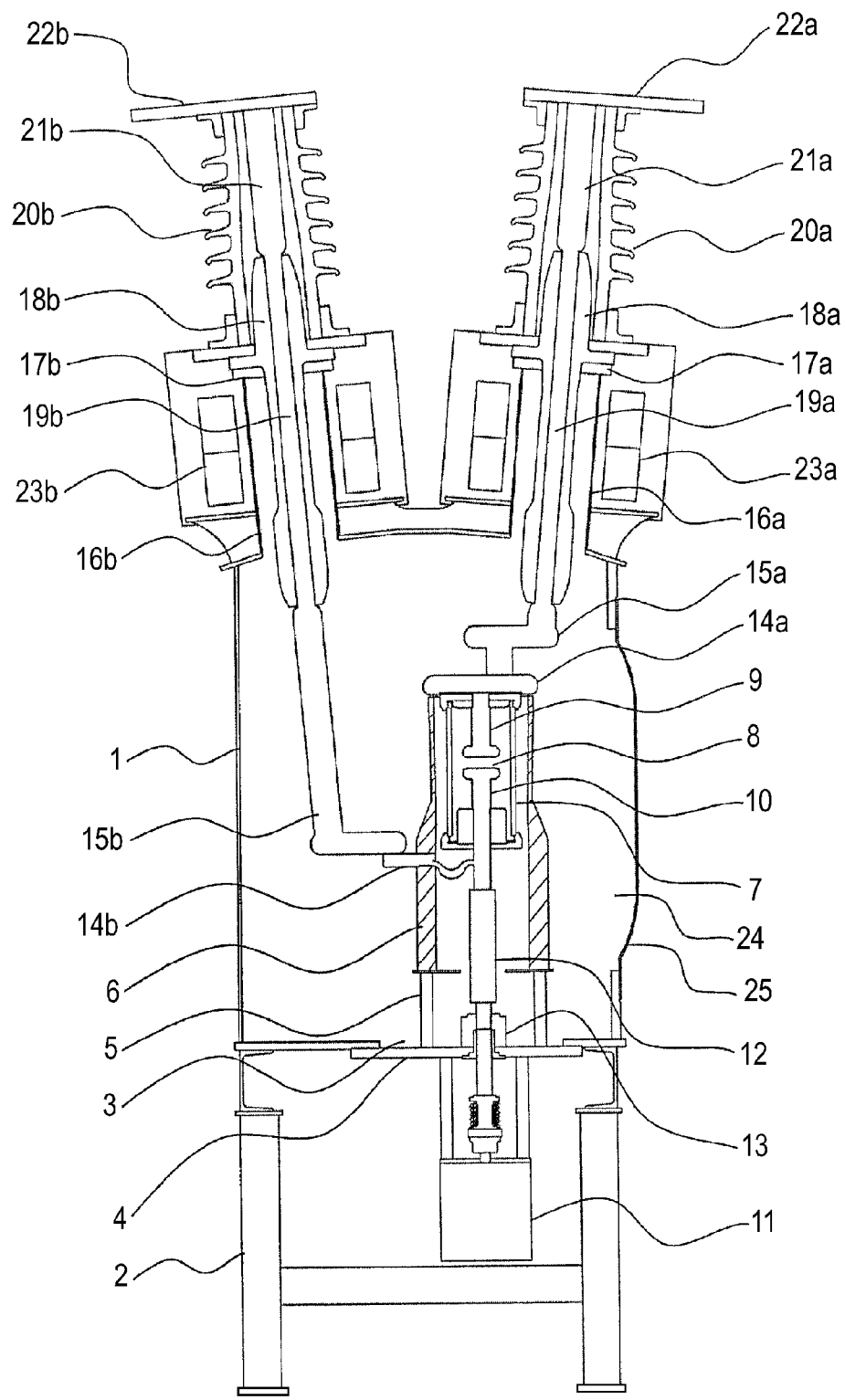
[FIG. 1A] A cross-sectional front view of a tank-type vacuum circuit breaker in accordance with a first embodiment of the invention.

The tank-type vacuum circuit breaker in accordance with the invention allows a vacuum interrupter placed in a pressure tank to be replaced within a short time and a small workspace with the breaker still installed.

Embodiments of the invention are described below based on the drawings.

Note that, through the drawings, the same reference numerals denote the same or corresponding components.

First Embodiment

Figure 1B:
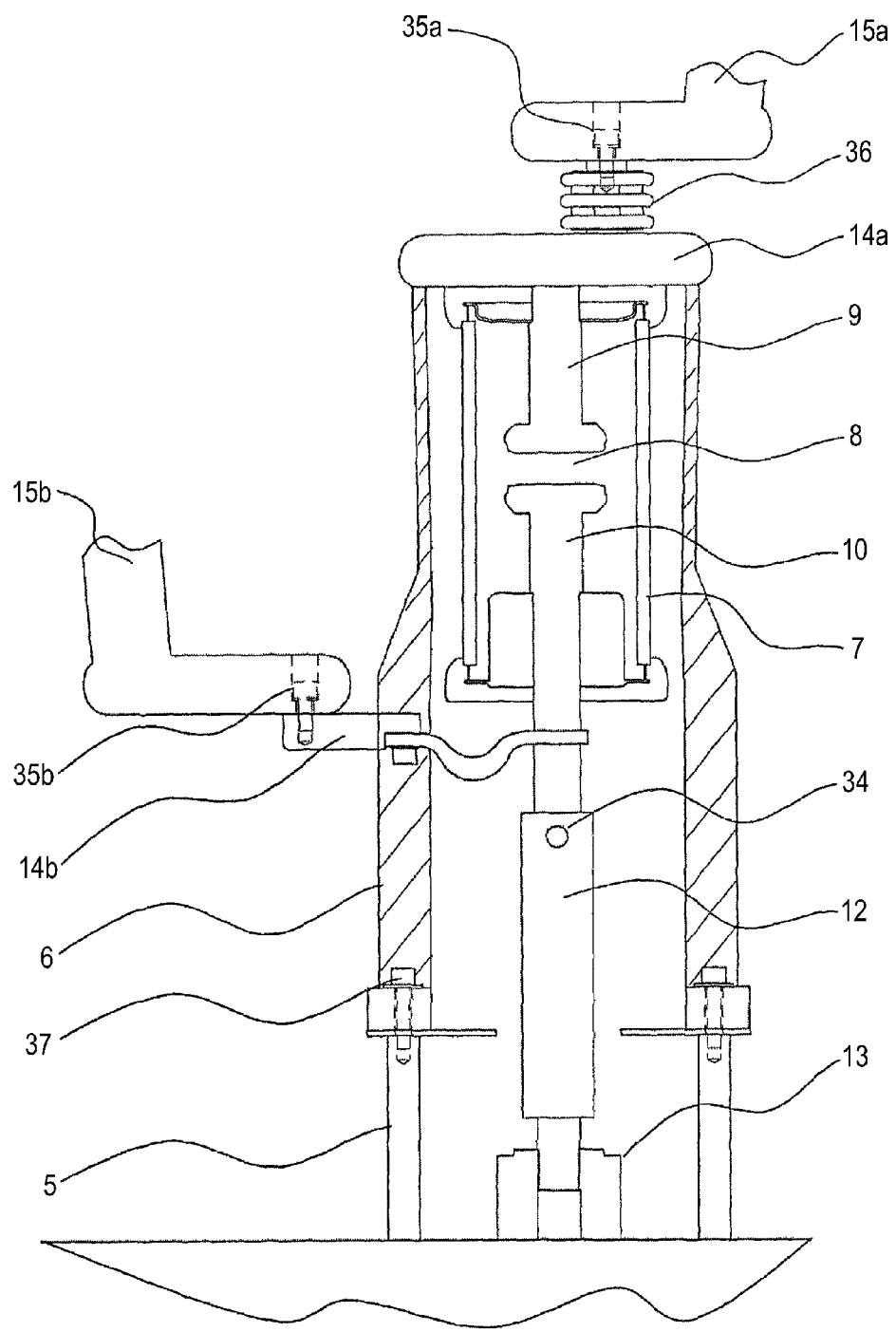
[FIG. 1B] A partial al cross-sectional view enlarging a main part of FIG. 1A.
Figure 2:
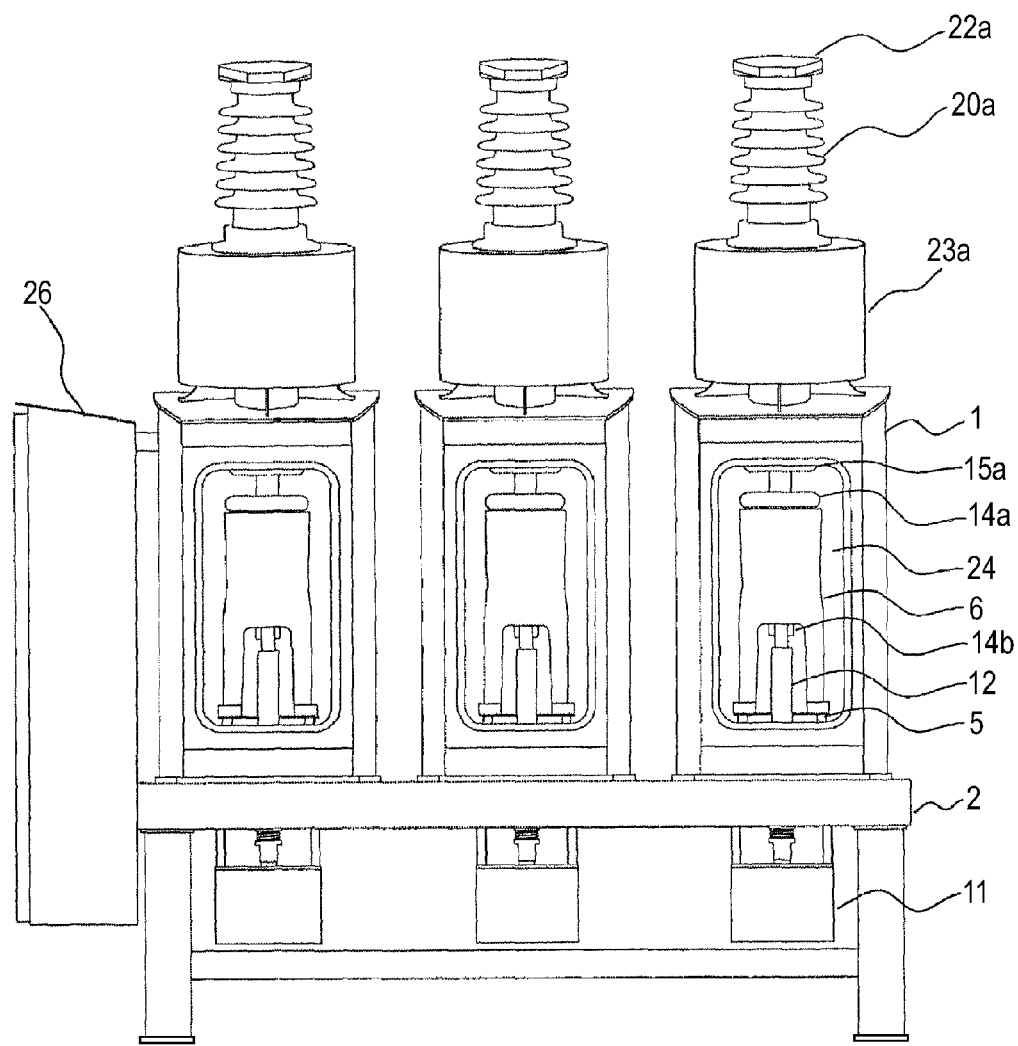
[FIG. 2] A side view of the tank-type vacuum circuit breakers, each shown in FIG. 1A, installed in three phases.

FIG. 1A is a cross-sectional front view of a tank-type vacuum circuit breaker in accordance with a first embodiment of the invention. FIG. 1B is a main part enlarged cross-section view of FIG. 1A. FIG. 2 is a side view of the tank-type vacuum circuit breakers, each shown in FIG. 1A, installed in three phases.

As shown in FIGS. 1A and 1B, in the breaker in accordance with the first embodiment of the invention, a pressure tank 1 that is electrically grounded and filled with an insulating gas is placed on a rack 2 with the body along the vertical direction. The pressure tank 1 includes an opening 3 on the bottom surface. The opening 3 is closed by a flange 4. A post 5 is mounted on the flange 4 toward the inside of the pressure tank 1. Then, a vacuum interrupter 7 is vertically supported by an insulating frame 6 composed of an insulating material, such as epoxy.

The vacuum interrupter 7 has one pair of contacts 8 therein, including: a stationary electrode 9 extending upwardly from the upper contact of the contacts 8; and a moving electrode 10 extending downwardly from the lower contact of the contacts 8.

On the other hand, an actuation mechanism 11 for moving up and down the moving electrode 10 of the vacuum interrupter 7 to close by connection or open by disconnection the contacts 8 is provided outside the flange 4. The moving electrode 10 is coupled to the actuation mechanism 11. However, the moving electrode 10 is insulated from the actuation mechanism 11 by an insulating rod 12 provided therebetween. Furthermore, in order to prevent the insulating gas within the pressure tank 1 from leaking, a flexible bellows 13 is used to keep the pressure tank 1 airtight where the flange 4 is passed through.

Terminals 14a and 14b are connected to the stationary electrode 9 and the moving electrode 10 of the vacuum interrupter 7, respectively. Furthermore, from the terminals 14a and 14b, an energization path for the breaker is extended toward the upper portion of the pressure tank 1 through in tank conductors 15a and 15b.

One pair of branch pipes 16a and 16b are welded to the upper portion of the pressure tank 1. At the upper end of the branch pipes, openings 17a and 17b are provided, which are closed by compartment spacers 18a and 18b to keep the pressure tank 1 airtight.

The compartment spacers 18a and 18b are made of an insulating material. However, the compartment spacers are passed through by in-compartment-spacer conductors 19a and 19b that are electrically connected to the above-described in-tank conductors 15a and 15b. Furthermore, bushings 20a and 20b are attached to the upper portion of the compartment spacers 18a and 18b. The bushings 20a and 20b are filled with an insulating gas and include in-bushing conductors 21a and 21b running therethrough that electrically connect the in-compartment-spacer conductors 19a and 19b to bushing terminals 22a and 22b provided at the upper end of the bushings 20a and 20b. Note that current transformers 23a and 23b for measuring a current flowing in the energization path are attached around the branch pipes 16a and 16b.

Note that the vacuum interrupter 7, the terminal 14a connected to the stationary electrode 9 and the terminal 14b connected to the moving electrode 10 are all fixed to the insulating frame 6.

As shown in FIG. 1B, the moving electrode 10 is connected to the insulating rod 12 with a coupling tool using a screw or coupling pin 34, and the terminals 14a and 14b are connected to the in-tank conductors 15a and 15b with fastening bolts 35a and 35b or sliding-type contacts, so these connections can be easily disconnected while still being installed in the pressure tank 1 and are also electrically connectably/disconnectably configured.

Furthermore, with the connections disconnected, when a fastening bolt 37 that fixes the insulating frame 6 to the post 5 is removed, the vacuum interrupter 7, the terminals 14a and 14b, the insulating frame 6 and the insulating rod 12 can be collectively removed as one unit.

In the body side surface of the pressure tank 1, a large working opening 24 having a size larger than or nearly equal to the size of the outside shape of the unit is provided. The opening 24 is normally sealed with a lid plate 25.

The lid plate 25 is pressurized by the insulating gas filling the pressure tank 1. However, the lid plate 25 is curved toward the outside to reduce stress, so can be made of a thin plate material despite the large opening.

When the lid plate 25 is removed, all of the above-described connections can be seen through the working opening 24 as shown in FIG. 2, and the work of removing the unit can be performed from the outside of the pressure tank 1. Furthermore, since the working opening 24 has a size larger than or nearly equal to the size of the outside shape of the unit and is positioned at almost the same height as the unit, the removed unit can be taken out horizontally to the outside of the pressure tank 1.

Note that the tank-type vacuum circuit breaker shown in FIG. 2 includes three phases of pressure tanks each of which includes a unit. In each of the pressure tanks, the unit can be removed and installed, and can be inserted into and taken out from the pressure tank 1 through the working opening 24.

According to the tank-type vacuum circuit breaker configured in this way, when the replacement of the vacuum interrupter 7 is performed with the breaker still installed in the power transmission and reception/distribution facility, the large working opening 24 allows efficient disassembling work even within the pressure tank 1 where workability is low, and the working opening 24 also serves as an outlet port for the unit to reduce the amount of work for opening and sealing the opening that takes long working hours which can result in significantly shortening outage hours of the power transmission and reception/distribution facility due to the replacement work.

Furthermore, since the unit is taken out in a direction along the radius of the vacuum interrupter 7, the workspace to be reserved around the working opening 24 may be small. Furthermore, only one opening is needed for the work, which may improve airtight reliability of the pressure tank 1 resealed after the work.

Second Embodiment

Figure 3:
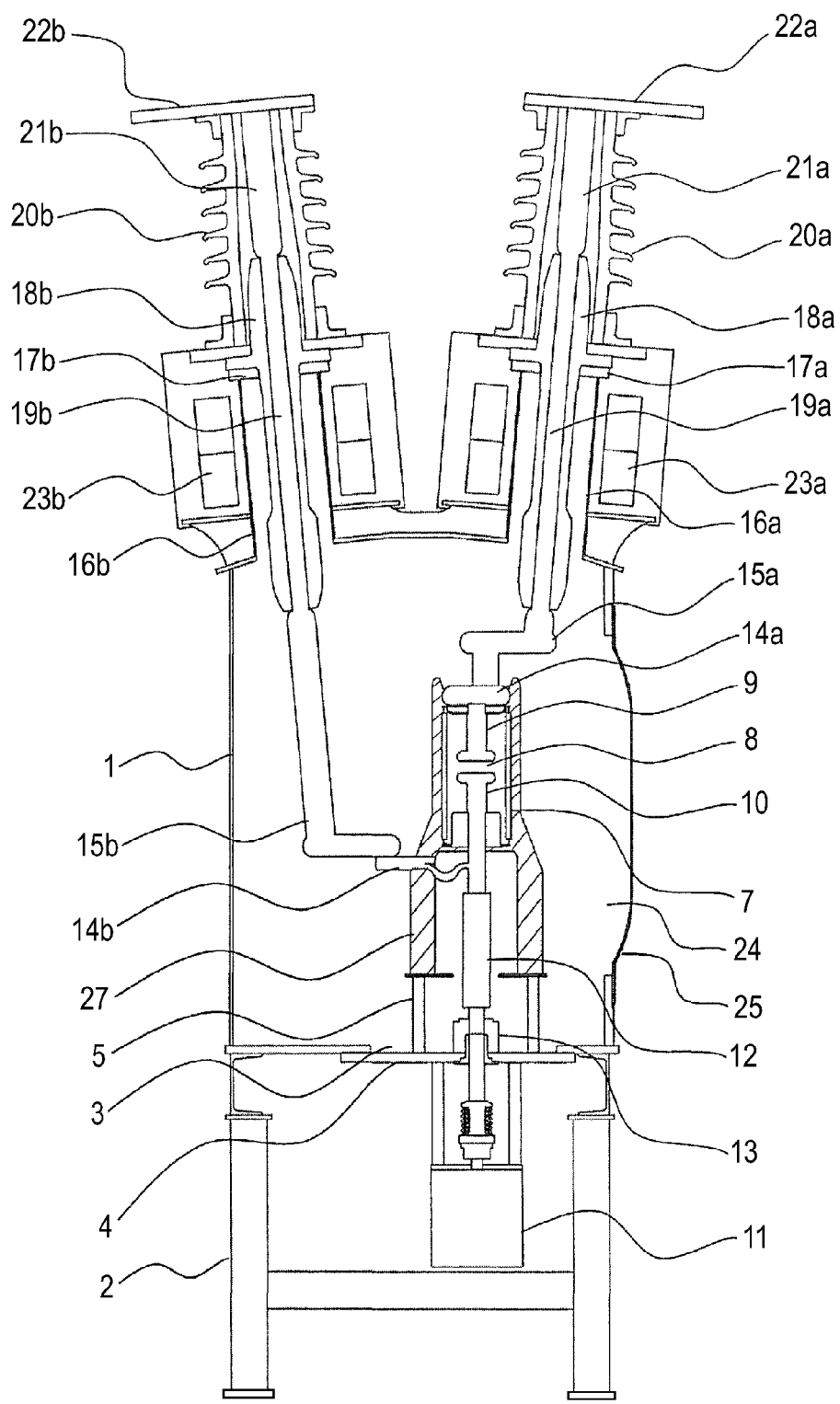
[FIG. 3] A cross-sectional front view of a tank-type vacuum circuit breaker in accordance with a second embodiment of the invention.

FIG. 3 is a cross-sectional front view of a tank-type vacuum circuit breaker in accordance with a second embodiment of the invention.

FIG. 3, the breaker in accordance with the second embodiment of the invention has almost the same configuration as that of the tank-type vacuum circuit breaker in the above-described first embodiment. However, the unit is integrated by casting or molding. Specifically, for example, the vacuum interrupter 7 and the terminals 14a and 14b connected to the stationary electrode 9 and moving electrode 10, respectively, are fixed by casting and integrating all of them in an insulator 27 rather than being fixed to the insulating frame.

In performing the replacement of the vacuum interrupter 7, the couplings and connections of the above-described cast product 27 and the post 5, insulating rod 12 and in-tank conductors 15a and 15b can be disassembled through the working opening 24 having a size larger than or nearly equal to the size of the outside shape of the cast product 27 provided in the body side surface of the pressure tank 1 as with the first embodiment.

Furthermore, since the working opening 24 is positioned at almost the same height as the cast product 27, the removed cast product 27 can be taken out horizontally through the working opening 24 to the outside of the pressure tank 1.

According to the tank-type vacuum circuit breaker configured in this way, casting a replacement vacuum interrupter in advance can minimize the amount of work in the power transmission and reception/distribution facility, which may further reduce outage hours.

Note that, as with the above-described tank-type vacuum circuit breaker shown in FIG. 2, the breaker in accordance with the second embodiment of the invention includes three phases of pressure tanks each of which includes a unit in the cast product 27. In each of the pressure tanks 1, the unit can be removed and installed, and can be inserted into and taken out from the pressure tank 1 through the working opening 24.

According to the breaker in accordance with the second embodiment, since the vacuum interrupter 7 and the terminals 14a and 14b are integrated by casting with an insulator on the side surface of the pressure tank, in repairing or replacing the vacuum interrupter, the coupling of the moving electrode 10 of the vacuum interrupter and the actuation mechanism 11, the connection of the terminals 14a and 14b and the conductor 15a and 15b on the stationary electrode side and the moving electrode side, respectively, of the vacuum interrupter, and the fastening part of the pressure tank 1 and the cast product 27 can be disassembled and then the whole cast product 27 can be taken out from the pressure tank to perform the replacement. This can minimize the amount of the replacement work and also reduce the number of work places for sealing the opening after replacing the cast product, thereby reducing overall working hours. Furthermore, the reduction in the number of work places for sealing the opening leads to improvement in airtight reliability of the pressure tank. Furthermore, the cast product is inserted or taken out in a direction along the radius of the vacuum interrupter, which can reduce the workspace.

Third Embodiment

Figure 4:
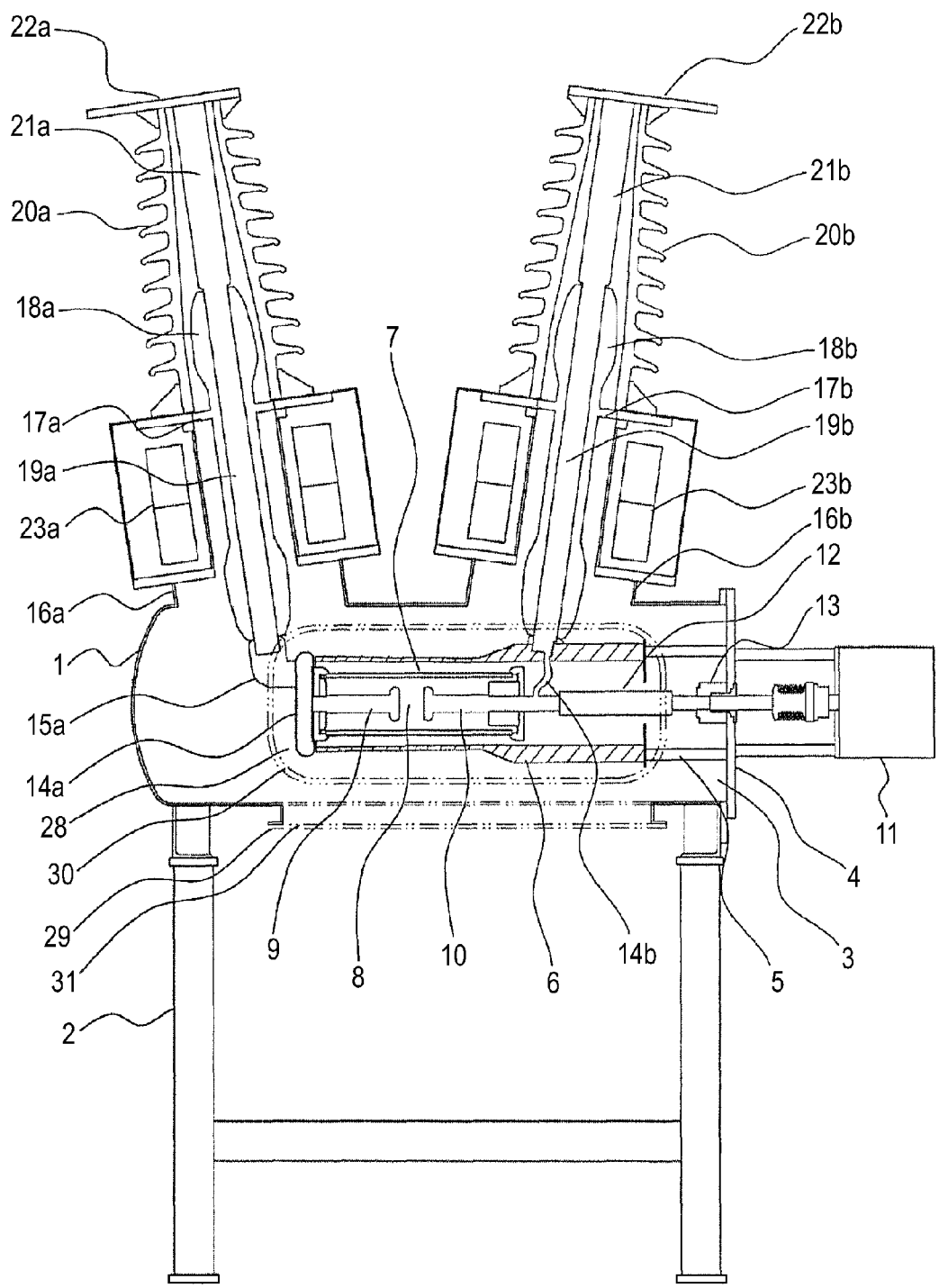
[FIG. 4] A cross-sectional front view of a tank-type vacuum circuit breaker in accordance with a third embodiment of the invention.

FIG. 4 is a cross-sectional front view of a tank-type vacuum circuit breaker in accordance with another embodiment of the invention.

Figure 5:
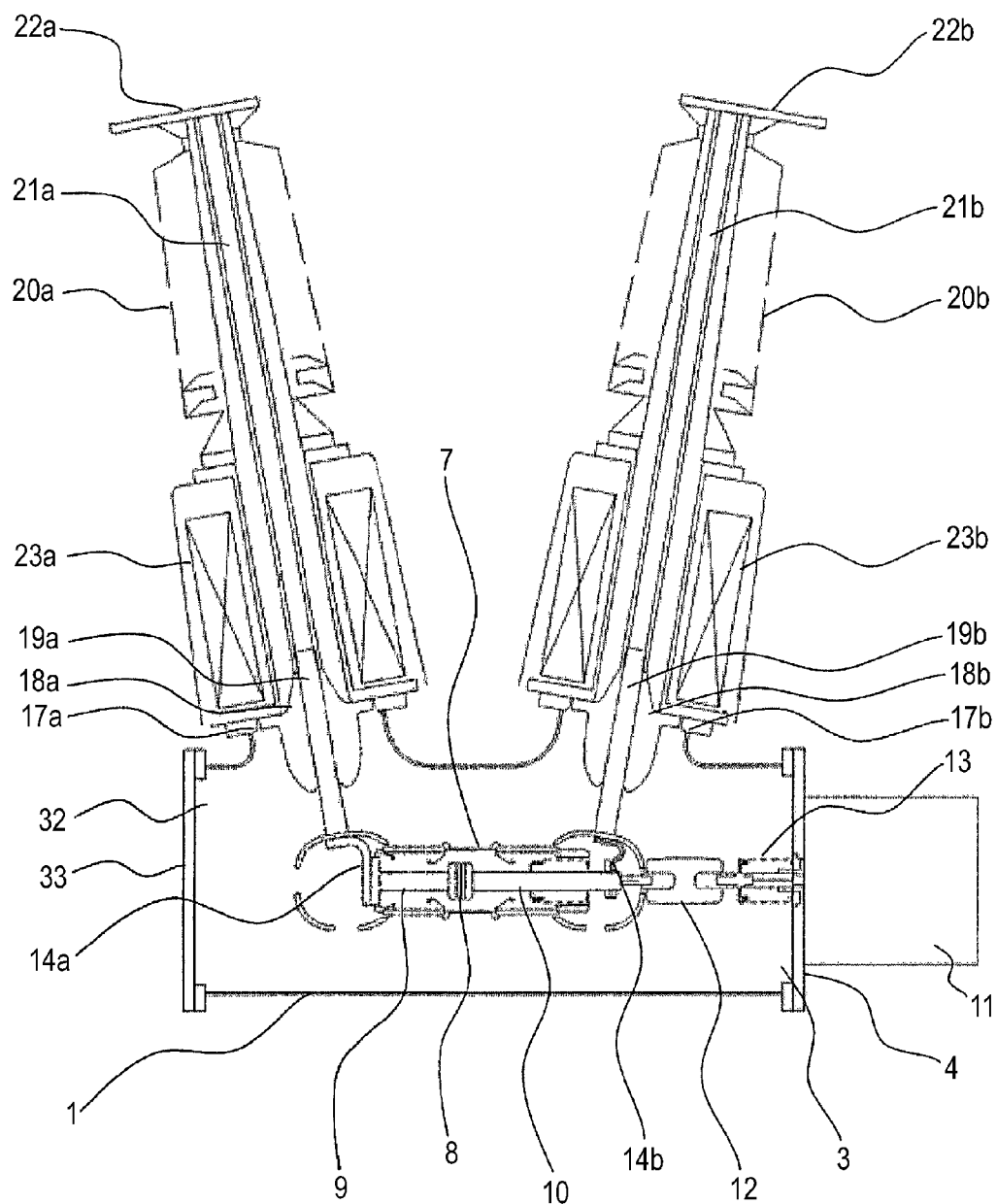
[FIG. 5] A cross-sectional front view of a conventional tank-type vacuum circuit breaker.

As shown in FIG. 4, the breaker in accordance with a third embodiment of the invention includes a pressure tank 1 placed on a rack 2 with the body aligned in the horizontal direction, as with the conventional tank-type vacuum circuit breaker shown in FIG. 5.

The pressure tank 1 includes an opening 3 at one end in the longitudinal direction. The opening 3 is closed by a flange 4. A post 5 is mounted on the flange 4 toward the inside of the pressure tank 1. Then, a vacuum interrupter 7 and terminals 14a and 14b connected to a stationary electrode 9 and a moving electrode 10 of the vacuum interrupter 7 are horizontally supported by an insulating frame 6.

Similarly to the first embodiment, in the body side surface or bottom surface of the pressure tank 1, working openings 28 and 29 having a size larger than or nearly equal to the size of the outside shape of the unit is provided. The insulating frame 6, the vacuum interrupter 7 and the terminals 14a and 14b can be collectively removed as one unit through the working opening 28 or 29, so the unit can be taken out horizontally or downwardly to the outside of the pressure tank 1.

Furthermore, similarly to the second embodiment, the above-described unit may be replaced by a cast product (molded product) in which the vacuum interrupter 7 and the terminals 14a and 14b are cast (or molded) and integrated in an insulator.

REFERENCE SIGNS LIST 1 pressure tank
2 rack
3 opening
4 flange
5 post
6 insulating frame
7 vacuum interrupter
8 contacts
9 stationary electrode
10 moving electrode
11 actuation mechanism
12 insulating rod
13 bellows
14a, 14b terminal 15a, 15b in-tank conductor
18a, 18b compartment spacer
19a, 19b in-compartment-spacer conductor
20a, 20b bushing
21a, 21b in-bushing conductor
22a, 22b bushing terminal
23a, 23b current transformer
24 working opening
24 lid plate
26 control box
27 cast product
28, 29 working opening
30, 31 working opening
34 coupling pin
35a, 35b fastening bolt
36 contact
37 fastening bolt

The invention claimed is:

1. A tank-type vacuum circuit breaker configured to be installed on a floor, comprising: a pressure tank that is electrically grounded and filled with an insulating gas; an insulating frame that is mechanically detachably supported by a support member provided in the pressure tank using a coupling, so that the insulating frame extends vertically with respect to the floor when the tank-type vacuum circuit breaker is installed on the floor; a vacuum interrupter having longitudinal sides and that is supported by and extends vertically parallel with the insulating frame, and includes a stationary electrode and a moving electrode that moves in a longitudinal direction parallel to the longitudinal sides of the vacuum interrupter; a stationary-electrode side terminal that extends farther away from the moving electrode in the longitudinal direction than the insulating frame and is provided on the stationary-electrode side and is electrically connectably/disconnectably connected to one bushing-terminal side internal conductor using a connection; a moving-electrode side terminal that is provided on the moving-electrode side and is electrically connectably/disconnectably connected to the other bushing-terminal side internal conductor using a connection; and an insulating rod, the inside end of which is mechanically detachably coupled to the moving electrode using a coupling and the outside end of which is coupled to an opening/closing actuation mechanism that is positioned outside the pressure tank and opens/closes the contacts of the stationary electrode and moving electrode, wherein the insulating frame is provided on at least the longitudinal sides of the vacuum interrupter so as to surround the external circumference of the vacuum interrupter, and the vacuum interrupter, the stationary-electrode side terminal, the moving-electrode side terminal and the insulating frame are integrated into a unit, and the unit can be removed and mounted within the pressure tank by disconnecting the connections and the couplings.

2. The tank-type vacuum circuit breaker according to claim 1, wherein the vacuum interrupter, the stationary-electrode side terminal and the moving-electrode side terminal are fixed to the insulating frame.

3. The tank-type vacuum circuit breaker according to claim 1, wherein the unit can be inserted into and taken out from the pressure tank through a working opening provided on the side wall of the pressure tank.

4. The tank-type vacuum circuit breaker according to claim 2, wherein the unit is integrated by casting or molding.

5. The tank-type vacuum circuit breaker according to claim 2, wherein the unit is installed horizontally or vertically within the pressure tank.

6. The tank-type vacuum circuit breaker according to claim 1, wherein the insulating frame is hollow so as to have an interior space, and the vacuum interrupter is inside the interior space.

7. The tank-type vacuum circuit breaker according to claim 1, wherein the insulating frame is hollow so as to have an interior space, and at least part of the insulating rod is inside the interior space.

8. The tank-type vacuum circuit breaker according to claim 1, wherein the moving-electrode side terminal is provided on one side of the insulating frame and the stationary-electrode side terminal is provided on an end of the insulating frame.

9. The tank-type vacuum circuit breaker according to claim 1, wherein the insulating frame is attached to the support member at at least two different locations.

10. The tank-type vacuum circuit breaker according to claim 1, wherein the insulating frame is hollow and substantially cylindrically shaped.

* * * * *